(12) United States Patent  
Berry

(10) Patent No.: US 6,559,773 B1  
(45) Date of Patent: May 6, 2003

(54) RECONFIGURABLE DISPLAY ARCHITECTURE WITH SPONTANEOUS RECONFIGURATION

(75) Inventor: Richard Charles Berry, West Bloomfield, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/468,170

(22) Filed: Dec. 21, 1999

(51) Int. Cl.[7] .................................................. G08B 5/00
(52) U.S. Cl. ...................... 340/815.4; 340/531; 701/29; 701/33; 700/17; 700/83; 345/326
(58) Field of Search .............................. 340/815.4, 531; 701/29, 33; 700/17, 83; 345/326

(56) References Cited

U.S. PATENT DOCUMENTS

| | | |
|---|---|---|
| 5,418,962 A | 5/1995 | Bodin et al. |
| 5,627,547 A * | 5/1997 | Ramaswamy et al. ...... 342/357 |
| 5,742,226 A * | 4/1998 | Szabo et al. ............. 340/425.5 |
| 5,794,164 A | 8/1998 | Beckert et al. |

OTHER PUBLICATIONS

Sun Microsystems, Inc., "Why Jini Now", Aug. 1, 1998, pp. 1–14.
Sun Microsystems, Inc., "What is Jini?"—Summary.
Clohessy, Kim, Object Technology, Inc., Virtual Machine Technology: Managing Complexity and Providing Portability for Embedded Systems.
Mobile GT, "The Architecture for Driver Information Systems".

* cited by examiner

*Primary Examiner*—Daniel J. Wu
*Assistant Examiner*—Tai T. Nguyen
(74) *Attorney, Agent, or Firm*—John E. Kajander

(57) ABSTRACT

A control panel/display subsystem acts as a device portal for interacting with multiple devices interconnected via a dynamic local network. Display content and the human-machine interface (HMI) implemented using the display subsystem automatically reconfigures itself when new devices are added to the vehicle network. An interface specifier enabling each new device to work with the device portal is obtained either from a local archive or a remote archive via connection with a remote network.

18 Claims, 3 Drawing Sheets

RECONFIGURABLE DISPLAY ARCHITECTURE WITH SPONTANEOUS RECONFIGURATION

BACKGROUND OF THE INVENTION

The present invention relates in general to a reconfigurable display/control panel for controlling various electronic accessories, and more specifically to an architecture for reconfigurable displays and an overall network for spontaneously interconnecting the displays with various electronic accessories or devices in a manner which automatically reconfigures menu elements shown on the reconfigurable display to interact with each electronic accessory.

Reconfigurable displays are used in automotive vehicles in order to control a plurality of electronic accessories from a single control panel. Such a system reduces cost, saves space on the vehicle instrument panel, and makes the electronic accessories easier to control. A reconfigurable display includes a generic graphic display surface, such as a dot matrix, and a collection of "soft keys" (i.e., programmable buttons). The function of each key is dynamically reconfigured via software to allow access to all the available functions or the accessories, typically using a menu structure. A typical reconfigurable display subsystem may also include a number of "hard keys", buttons that provide instant access to frequently used functions (e.g., navigation, climate control, audio players, etc.).

Because of their generic, reusable nature, reconfigurable automotive displays have facilitated an increase in the number of features that are made available to the user. Consumers are demanding ever-greater functionality from their electronic accessories, while product design cycles of the accessories are simultaneously becoming shorter. Thus, it becomes a major challenge for manufacturers to provide new and innovative system architectures while delivering high content, high quality products and features at a reasonable cost.

First generation automotive reconfigurable display systems utilize embedded architectures that build specific feature content into the display design that cannot be altered or augmented after the design is implemented. All supported features must be identified at the time of initial design. While this approach provides high performance and low cost, it lacks flexibility.

Second generation automotive reconfigurable display systems utilize a personal computer (PC) type of architecture, such as the AutoPC platform. Such systems enable incremental feature deployment, wherein new features can be integrated seamlessly with those already present. However, such feature deployment is essentially a static model since installed software applications occupy a percentage of the display resources at all times. Thus, it is distinctly possible that system resources could be inadvertently depleted during installation of a new feature. Furthermore, such customization requires installation skills on the part of the users (not just system developers and integrators), which limits the utility of such customization for a significant percentage of customers. Such systems are not truly "plug-and-play" since a manual installation procedure is required.

SUMMARY OF THE INVENTION

The present invention has the advantage of providing a reconfigurable display architecture in which a human-machine interface (HMI) is dynamically constructed in response to the electronic accessories which are present in the system.

In one aspect of the invention, an electronic accessory display/control system is provided for a transportation vehicle. A reconfigurable control panel has a visual display for displaying menu items for an electronic accessory and has at least one control actuator. A human-machine interface controller is coupled to the reconfigurable control panel and includes a local archive for storing a plurality of interface specifiers. Each specifier defines interaction between the reconfigurable control panel and a respective electronic accessory for performing operations via the menu items using a predetermined communications protocol. The system includes an expandable interconnection link for coupling compatible electronic accessories with the human-machine interface controller. A wireless transceiver is provided for accessing a remote archive of interface specifiers. The remote archive includes interface specifiers each adapted for a corresponding combination of a particular electronic accessory and a particular reconfigurable control panel. The human-machine interface controller responds to a coupling of an electronic accessory to the expandable interconnection link by checking the local archive for presence of a desired interface specifier corresponding to the electronic accessory and the reconfigurable control panel. If the desired interface specifier is not present in the local archive, then the wireless transceiver is activated to automatically obtain the desired interface specifier from the remote archive.

DETAILED DESCRIPTION OF PREFERRED EMBODIMENTS

The present invention creates a device portal within a network architecture having a dynamically constructed human-machine interface (HMI). A control panel/display subsystem includes a collection of hard and soft controls and is made available as a network resource on a dynamic local network. The display subsystem of the device portal may include standard embedded features such as an audio tuner or CD player, but its main purpose is to be dynamically reconfigurable to interact with other network resources via a collection of standard protocols. These other network resources include devices such as a navigation system, cellular phone, audio player, a palm-size PC, or any other device employing an HMI in the vehicle. These devices need not be present in the network at all times. Using Java/Jini technology or similar technology, a dynamic network can be constructed which allows automatic installation of devices into the network.

Figure 1:
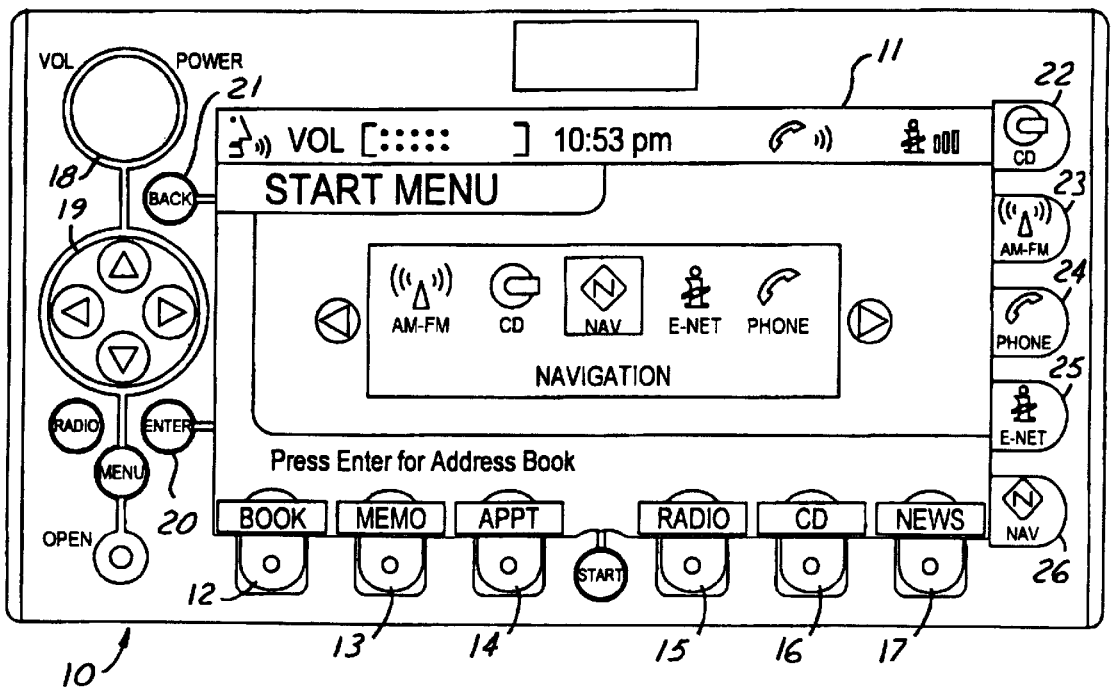
FIG. 1 is a front, plan view of a reconfigurable display employing the present invention.

Referring to FIG. 1, a control panel/display subsystem 10 includes a multi-element graphical display 11. A plurality of push buttons 12–17 provide soft keys for accessing functions as identified by graphic/text labels displayed on display screen 11. Hard controls include a knob 18 which is pressed to control system power and can be rotated to control audio volume. An arrow pad 19 is used to navigate through menus displayed on display screen 11. An enter button 20 and a back button 21 are also used to navigate through menu screens. A plurality of shortcut buttons 22–26 are provided to create shortcuts to menu screens for device functionality embedded in subsystem 10 (e.g., CD player or AM/FM radio).

An HMI for a particular electronic accessory device includes graphical display elements to identify the device and its available features. A menu screen for each accessory device includes labels to be displayed associated with particular soft keys 12–17 to identify controllable functions of the device. For the electronic accessory of a cellular phone, the soft keys may be associated with cellular phone functions of accessing memory locations, initiating a call, ending a call, or other functions performable by the phone. Display-screen 11 can also be used to display event information as communicated from the cellular phone, such as connection status, duration of call, and other information communicated by the cellular phone to display subsystem 10.

Figure 2:
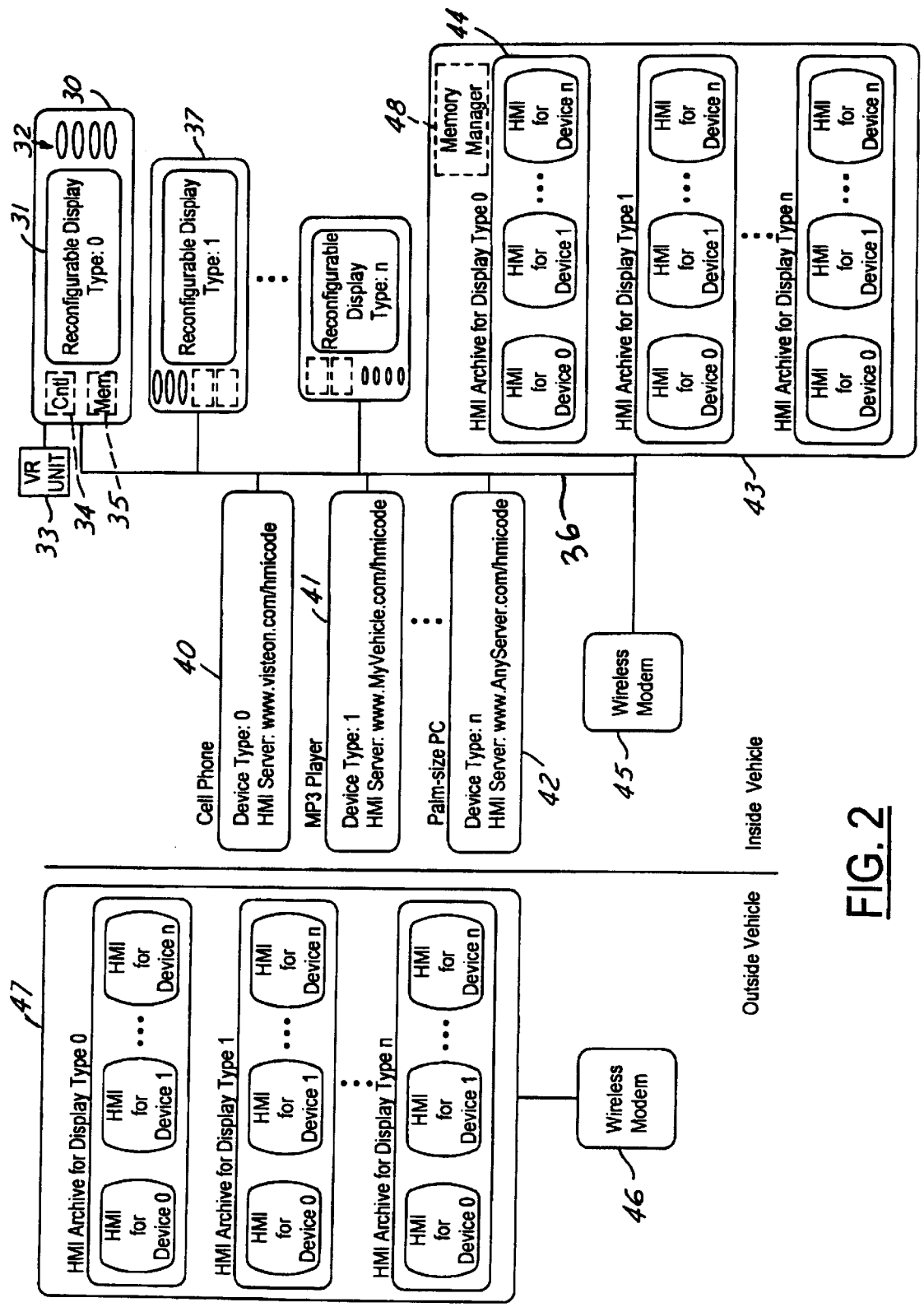
FIG. 2 is a schematic diagram showing the overall network system of the present invention.

The use of the reconfigurable display subsystem as a device portal in a dynamic local network is shown in FIG. 2. Reconfigurable display subsystem 30 includes a display screen 31 and hard and soft keys 32. Display subsystem 30 may also receive input commands from a voice recognition unit 33. An HMI controller 34 resides in display subsystem 30 and controls graphical display screen 31, monitors keys 32, accepts input from voice recognition (VR) unit 33, and interfaces with devices on the dynamic local network 36. A memory 35 stores interface specifiers (i.e., drivers) used by controller 34 to drive graphic display screen 31 and to communicate with the various electronic accessory devices on dynamic local network 36.

Each particular display subsystem ("device portal") design is uniquely identified by a type identifier. Thus, display subsystem 30 is identified as type 0, while additional display subsystems which may be connected to the local dynamic network 36 have different identifiers such as type 1 for a display subsystem 37 and type n for a display subsystem 38.

Dynamic local network 36 includes a collection of software and communication specifications and standard protocols for hardware interconnection. Examples of such a system are Jini by Sun Microsystems, Inc., JetSend by Hewlett-Packard, and Bluetooth by the Bluetooth Special Interest Group. System resources such as reconfigurable display subsystems, electronic accessories or other components can join the network automatically once they are connected to it. Network 36 recognizes the coupling of a new device to the network and interacts with all the network resources as appropriate to enable operation of the new device within the network. Examples of electronic accessories connected to the network in FIG. 2 include a cellular phone 40, an MP3 audio player 41, and a palm-sized PC or personal digital assistant (PDA) 42. Once connected to the network 36, these accessories will communicate core functionality control signals and messages with a particular display subsystem. Thus, the accessory and the reconfigurable display subsystem will exchange messages concerning control actions and state changes or events but would not include specific messages on how to display messages or how the display is to be driven.

Each device 40–42 includes a unique device type identifier. Each device type may interact with a predetermined reconfigurable display type using an interface specifier developed for the combination of device and display subsystem. Thus, when HMI controller 34 detects the presence of a new electronic accessory, it determines the device type for the accessory and checks whether it currently has an interface specifier to support interaction with the device stored in memory 35. If the desired interface specifier is present, then HMI controller 34 can communicate core functionality messages between the reconfigurable display and the accessory device. If an appropriate interface specifier is not already contained in memory 35, then HMI controller 34 takes steps to retrieve an appropriate interface specifier, if possible.

A memory in each reconfigurable display subsystem provides a local archive for storing a plurality of interface specifiers each of which defines interaction between the reconfigurable display subsystem and a respective electronic accessory. Whenever an additional interface specifier must be retrieved, it may preferably be obtained using a universal resource locator (URL) of a server that contains a further collection of HMI interface specifiers. Such a server may also be a local archive in the vehicle directly connected to dynamic local network 36 as shown by a server 43 in FIG. 2. Server 43 is a local server containing a first group of HMI interface specifiers 44 corresponding to the configurable display type zero. Additional HMI interface specifiers are stored in other groups for other reconfigurable display types as shown. For each reconfigurable display type, a plurality of interface specifiers are stored as indexed by device type. Server 43 may be constructed with some interface specifiers contained in a read-only memory (ROM) in order to provide a fixed set of interface specifiers for a known set of electronic accessories which are expected to be utilized in a particular vehicle. In addition, re-writeable memory may also be included for subsequent storage of interface specifiers for other device types in order to provide flexibility for growth.

In order to accommodate electronic accessory devices not included in local server 43, the present invention also provides access to a remote archive web server outside the vehicle. Thus, a wireless modem 45 is interconnected with dynamic local network 36 and can be used to communicate with a remote wireless modem 46 which is connected to a remote web server 47 containing additional interface specifiers in a remote archive. Remote server 47 may be connected to the world-wide web or internet and wireless modem 46 may be connected to an internet service provider (ISP), for example. The URL address for remote server 47 may be a predetermined address as defined by convention and stored in either local server 44 or HMI controller 34, for example. Preferably, the URL address of an remote archive may be obtained directly from each accessory device itself. Thus, cellular phone 40 stores a remote archive address providing the URL to the other resources on dynamic local network 36. Thus, cellular phone 40 stores URL of www.visteon.com/hmicode where an appropriate interface specifier corresponding to cellular telephone device type 0 and a plurality of reconfigurable display types are stored. Thus, as new electronic accessory devices are developed, interface specifiers can also be developed in order to interface the new device with the existing reconfigurable display types. The location from where these interface specifiers can be retrieved is stored in the new accessory device, thus making the device compatible with all reconfigurable displays of those types.

Figure 3:
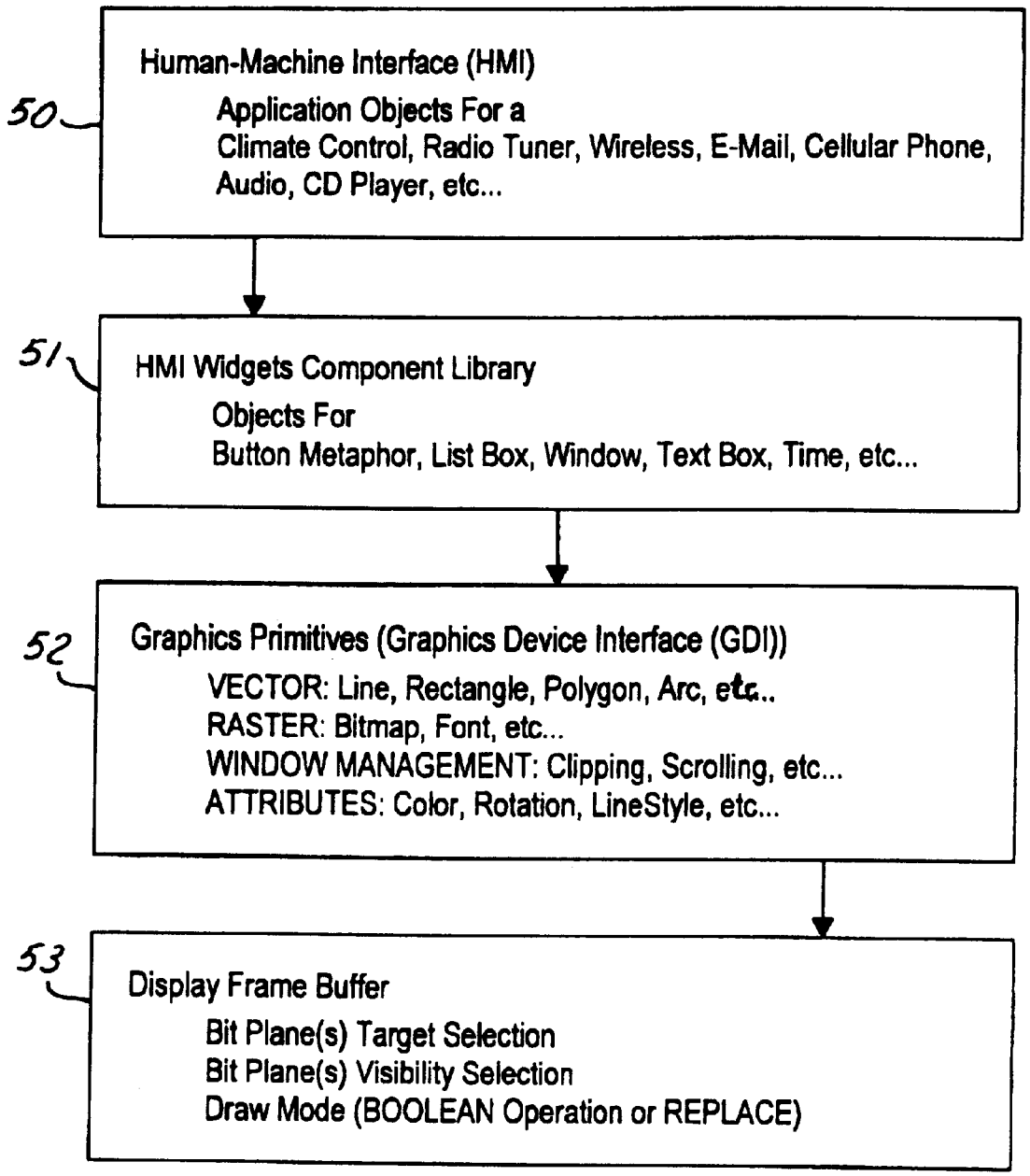
FIG. 3 is a block diagram showing the interaction of software objects for forming a human-machine interface and its interaction with the reconfigurable display.

FIG. 3 shows the various software elements required in the system of FIG. 2, including software elements comprising the HMI itself, (i.e., the interface between the display subsystem and the accessory device and software for driving the display). Thus, a human-machine interface software element 50 provides application objects for a particular accessory such as climate control, radio tuner, wireless information service, e-mail, cellular phone, audio, CD player, or others. These objects interact with other objects in an HMI widgets component library 51 including such objects as button metaphor (i.e., button icon and identification of corresponding soft key), list box, window, text box, time, and others. These objects interact with graphics primitives 52 providing a graphics device interface. These graphics primitives define vector shapes, raster elements, perform window management, and provide graphic attributes. These primitives interact with software for display frame buffer 53 for managing display activation such as target selection, visibility selection, and drawing mode.

More specifically, an interface specifier which would be downloaded from either a local or a remote archive contains compiled software class objects that collectively implement an application specific HMI for the unique display driver/accessory device combination. In a Java implementation, these objects will be precompiled from Java source code into Java bytecodes which are the instructions that run on the Java Virtual machine (JVM). Some of these downloaded objects implement an overall HMI for the specific class of application of the accessory device, such as cellular phone, compact disc player, or address book. Some of the other downloaded objects are generic (i.e., application independent) and can be applied to a wide range of applications. These generic, reusable components or widgets may typically already reside in the display subsystem, but may be included in a downloaded interface specifier for completeness and flexibility to use display subsystems not already containing the widgets. Downloading may include the capability to identify objects already residing in the display subsystem and then only downloading objects which are in fact needed.

The behavior of a particular HMI is embedded in the collection of class objects within the interface specifier and include four main functional areas: 1) processing user input events, 2) processing device events, 3) rendering graphic displays, and 4) sending commands to devices.

User input events are generated when a user manipulates a control actuator of the display subsystem, such as pressing a button, issuing a voice command, manipulating the pointing device such as a mouse or track ball, or otherwise initiates a control action. Physical device events are represented by software abstractions and are reported to the accessory device via the dynamic local network. Examples of physical device events include button pressed, button held, button released, switch closed, switch opened, pointing device position change, pointing device pressed, pointing device held, and pointing device released. The control actuator being used may be physically contained on the display subsystem or may be remotely connected to the display subsystem, such as a pointing device mounted on a steering wheel in the vehicle.

Objects for processing device events provide notification to the display subsystem of state changes occurring within the electronic accessory device. Specific device events depend upon the functionality of the particular electronic accessory device. For an electronic accessory device providing navigation features, examples of device events include notification of a pending route maneuver, vehicle approaching destination, vehicle off-route, and others.

With regard to software objects to render graphics on the visual display, these objects respond to user input or device or system events (e.g., power-up initialization) to initiate and execute all required rendering operations. The HMI interface specifier embeds the knowledge of how to display the information, including font size, screen location, number of digits, size and shape of graphic elements, timing for animated components, etc.

The software objects include those that send predetermined commands to the electronic accessory devices in order to enable the user to control and monitor the devices. Some typical examples include incrementing or decrementing a CD track selection, selecting an FM radio pre-set, adjusting the time-of-day clock, setting climate control temperature or fan speed, dialing a phone number, and others. The specific implementation of the user interface specifier can enable these actions in many different ways. These objects correlate user input events with the corresponding control action.

Figure 4:
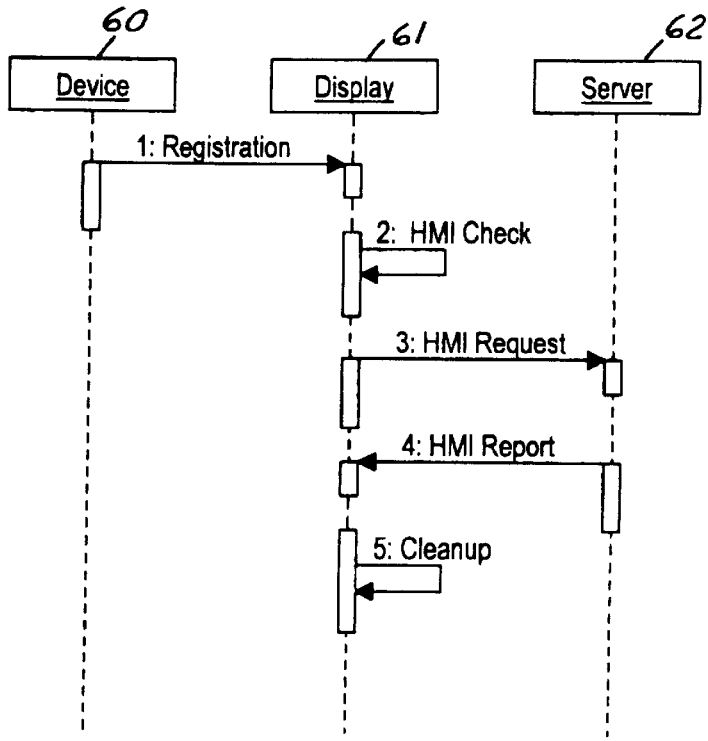
FIG. 4 illustrates the main tasks executed when a new device is joined into the vehicle network.

A preferred method of the present invention will be described in connection with FIG. 4. The sequence of steps shows interaction between an accessory device 60, a reconfigurable display subsystem 61, and a server 62 containing an archive of interface specifiers. Device 60 is a pluggable device such as a cellular phone, palm-size PC, or MP3 player and is identified via a device type identifier which is embedded into the device's persistent storage, such as ROM or FLASH. Persistent storage also contains a universal resource locator (URL) that indicates the location of an HMI server containing interface specifiers corresponding to the device. Display subsystem 61 likewise has its own display type identifier embedded into persistent storage. Server 62 may be a local server or a world-wide web server containing collections of HMI interface specifiers for the various display subsystem and accessory device combinations. The server processes requests for interface specifiers which include the device type identifier and the display type identifier. The first phase of the process is registration. In registration, device 60 communicates its presence to resources on the dynamic local network and provides its device type identifier and the URL of a server containing a collection of interface specifiers corresponding to the device. The second phase of the process is an HMI check in which the display subsystem 61 checks to see if it already has an interface specifier supporting the accessory device represented by the device type identifier. If a supporting interface specifier is already present, then the device automatically begins to use the display subsystem as a device portal.

If a supporting interface specifier is not present, then the third phase of the process is entered which comprises an HMI request. This phase includes attempting to connect to the server specified by the device. If connection is successful, the display subsystem communicates the device type identifier and the display type identifier to the server.

HMI report is the fourth phase of the process. Once the server successfully receives a request it checks its archive of HMI interface specifiers for a match as defined by the display type identifier and device type identifier. If a match is found, it returns the interface specifier packaged as a Java archive (JAR) file, for example. If not, it sends a message specifying that no interface specifier is available for the device/display combination. In the clean-up phase, display subsystem 61 responds to the information obtained from the server. If the server indicated that no interface specifier was available, then the display subsystem indicates an error condition to the user. If a JAR file was successfully returned, then the display subsystem extracts and installs the new software objects automatically to allow the display subsystem to act as a device portal for the installed device.

In order to minimize the amount of memory required for storing interface specifiers, and to simultaneously reduce download times required, a memory manager or caching technique is used for storing interface specifiers. Preferably, a memory in any individual subsystem is large enough to hold interface specifiers to service the complete maximum load of accessory devices that may be in operation using the display subsystem at any one time. Since some devices may be disconnected after having been used in the system, some interface specifiers may be present in memory in a display subsystem for which the original accessory device is no longer present in the network. According to the present invention, any such inactive interface specifier is given a lower priority than active interface specifiers. Furthermore, the longer an interface specifier has been inactive, the lower priority it is given relative to other inactive interface specifiers. If the amount of remaining free memory becomes restricted, the HMI controller deletes the lowest priority interface specifiers to make room for additional interface specifiers for other accessory devices that have joined the network. Priority assignments may also take into account file size and/or frequency of use so as to minimize overall downloading to restore interface specifiers that have been deleted.

Local server 43 in FIG. 2 may also contain a memory manager 48 for similarly managing prioritizing and/or deletion of HMI interface specifiers to most effectively use storage space in server 43.

With regard to the dynamic local network, this may take the form of an RF-wireless network using the Bluetooth specification, for example. When a wireless-capable accessory comes within communication distance of the dynamic local network, this is detected by means of a wireless polling signal exchanged between the local network and the new device. Based on a response to the polling signal, the devices exchange network messages to establish the new device as a resource available to devices on the local network.

What is claimed is:

1. An electronic accessory display/control system for a transportation vehicle, comprising:
   a reconfigurable control panel having a visual display for displaying menu items for an electronic accessory and having at least one control actuator;
   a human-machine interface controller coupled to said reconfigurable control panel and including a local archive for storing a plurality of interface specifiers, each specifier defining interaction between said reconfigurable control panel and a respective electronic accessory for performing operations via said menu items using a predetermined communications protocol;
   an expandable interconnection link for coupling compatible electronic accessories with said human-machine interface controller; and
   a wireless transceiver for accessing a remote archive of interface specifiers, wherein said remote archive includes interface specifiers each adapted for a corresponding combination of a particular electronic accessory and a particular reconfigurable control panel;
   wherein said human-machine interface controller responds to a coupling of an electronic accessory to said expandable interconnection link by checking said local archive for presence of a desired interface specifier corresponding to said electronic accessory and said reconfigurable control panel, and if said desired interface specifier is not present in said local archive then activating said wireless transceiver to automatically obtain said desired interface specifier from said remote archive.

2. The electronic accessory display and control system of claim 1 wherein said desired interface specifier assigns a predetermined function to said control actuator.

3. The electronic accessory display and control system of claim 1 wherein said expandable interconnection link is comprised of a dynamic local network.

4. The electronic accessory display and control system of claim 3 wherein said dynamic local network is comprised of a wireless network, and wherein presence of new electronic accessories is detected automatically in response to a wireless polling signal.

5. The electronic accessory display and control system of claim 1 wherein said compatible electronic accessories each provide to said human-machine interface controller a unique device identifier and a remote network address for said remote archive.

6. The electronic accessory display and control system of claim 1 wherein said interface specifiers are comprised of software objects.

7. The electronic accessory display and control system of claim 6 wherein said software objects include objects to process user events initiated by said control actuator.

8. The electronic accessory display and control system of claim 6 wherein said software objects include objects to process device events corresponding to a state change within said electronic accessory.

9. The electronic accessory display and control system of claim 6 wherein said software objects include objects to render graphics on said visual display.

10. The electronic accessory display and control system of claim 6 wherein said software objects include objects to send predetermined commands to said electronic accessory.

11. The electronic accessory display and control system of claim 1 further including said electronic accessory, and wherein said electronic accessory is comprised of a portable computing device.

12. The electronic accessory display and control system of claim 1 further including said electronic accessory, and wherein said electronic accessory is comprised of a mobile communication device.

13. The electronic accessory display and control system of claim 1 wherein said control actuator is comprised of a push button switch.

14. The electronic accessory display and control system of claim 1 wherein said control actuator is comprised of a speech recognition unit.

15. The electronic accessory display and control system of claim 1 further comprising a memory manager for prioritizing interface specifiers stored in said local archive and deleting interface specifiers of lower priority when said local archive becomes full.

16. A method of operating an electronic accessory display and control system for a transportation vehicle, said system including a reconfigurable control panel, a human-machine interface controller, an expandable interconnection link for compatible electronic accessories, and a wireless transceiver, said method comprising the steps of:
   storing a plurality of interface specifiers in a local archive, each interface specifier defining interaction between said reconfigurable control panel and a respective electronic accessory for performing operations via menu items using a predetermined protocol for said reconfigurable control panel;
   coupling one of said compatible electronic accessories with said human-machine interface controller via said expandable interconnection link;

checking, in response to said coupling, said local archive for presence of a desired interface specifier corresponding to said compatible electronic accessory and said reconfigurable control panel; and if said desired interface specifier is not present in said local archive, then activating said wireless transceiver to automatically obtain said desired interface specifier from a remote archive containing an interface specifier adapted for combination of said compatible electronic accessory and said reconfigurable control panel.

17. The method of claim 16 wherein said coupled compatible electronic accessory stores a remote network address of said remote archive.

18. The method of claim 16 further comprising the steps of:

prioritizing said interface specifiers stored in said local archive; and deleting an interface specifier of lower priority when said local archive becomes full.

* * * * *